No. 696,823. Patented Apr. 1, 1902.
J. R. JONES.
PLANTER AND CULTIVATOR.
(Application filed July 12, 1901.)
(No Model.) 2 Sheets—Sheet 1.
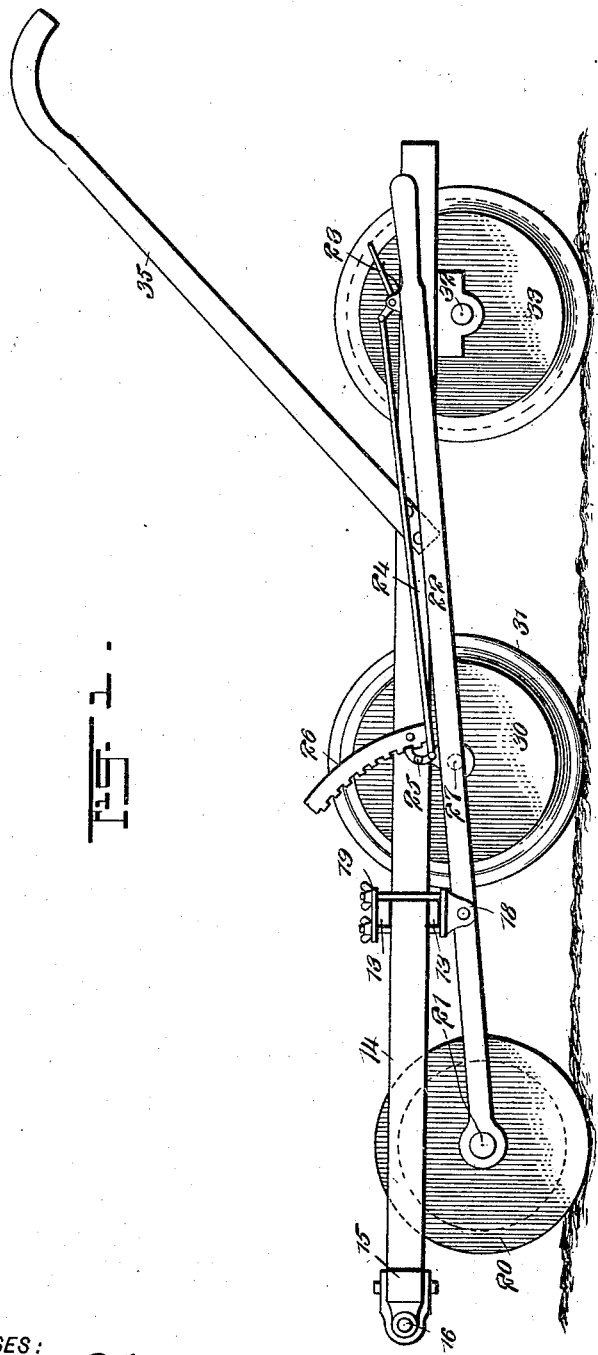
WITNESSES:
INVENTOR
Jesse R. Jones
BY
ATTORNEYS

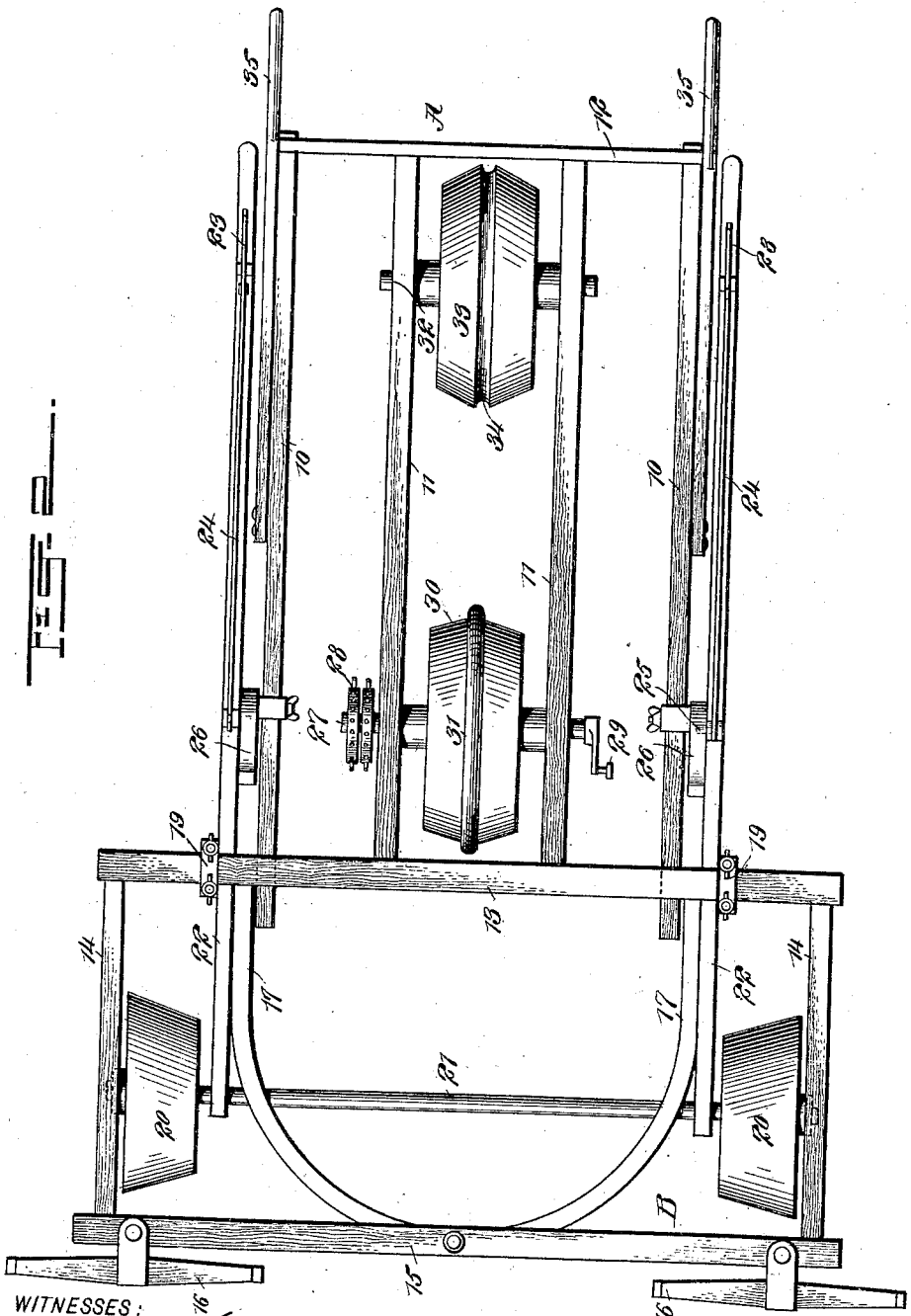

UNITED STATES PATENT OFFICE.

JESSE RUBLE JONES, OF JACKSON, MISSISSIPPI.

PLANTER AND CULTIVATOR.

SPECIFICATION forming part of Letters Patent No. 696,823, dated April 1, 1902.

Original application filed March 7, 1901, Serial No. 50,185. Divided and this application filed July 12, 1901. Serial No. 68,010. (No model.)

*To all whom it may concern:*

Be it known that I, JESSE RUBLE JONES, a citizen of the United States, and a resident of Jackson, in the county of Hinds and State of Mississippi, have invented a new and useful Improvement in Planters and Cultivators, of which the following is a full, clear, and exact description, this being a division of my application for Letters Patent for a planter and cultivator filed by me on March 7, 1901, Serial No. 50,185.

The purpose of the invention is to provide the frame of the implement with wheels which may be arranged in tandem, and to so construct the advance wheel that it is provided with means for making a concavity in the center of which is a groove, in the ground for the reception of seed, and to construct the rear wheel in such manner that it will press the earth or fertilizer to and not upon the planted seed. The peripheral surfaces of the wheels are so shaped that a longitudinal groove to receive the seed will be formed in a concave surface.

A further purpose of the invention is to provide means for adjustably supporting the forward end of the frame of the implement through the medium of wheels so shaped as to direct the earth toward the longitudinal center of the implement-frame.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the frame of a planter and cultivator and the improvement applied thereto, and Fig. 2 is a plan view of the same.

The form of the frame shown in the drawings comprises a main back section A and a front section B. The rear section of the frame consists of two parallel side beams 10, two intermediate longitudinal beams 11, and a rear tie-bar 12. The front section B of the frame consists of upper and lower beams 13, together with two side bars 14, and a front beam 15, which may connect the side bars and to which front beam the draft-trees 16 are attached; but, if desired, the front bar 15 may have the motion of a doubletree passing over the side bars 14 and being pivotally connected to a forwardly-extending horizontal arch 17, secured to the transverse beams 13 and the sides of the rear section of the frame. Hangers 18 are secured by clips 19 or their equivalents to the upper and lower beams 13 for a purpose to be hereinafter described. The upper and lower beams 13 may be secured to the forward portions of the side beams 10 in any suitable or approved manner.

The forward portion of the main frame is adjustably supported by wheels 20. These wheels are preferably in the shape of the frustum of a cone for the purpose of obtaining better purchase upon the ground and for directing the dirt inward. The wheels 20 are loosely mounted upon or are held to turn with an axle 21, mounted in the forward ends of arms 22, fulcrumed upon the hangers 18. These arms 22 extend usually to the rear portions of the main frame, and each arm 22 is provided with a latch-lever 23. Each latch-lever is connected by a link 24 with a pawl 25 upon the main frame. The pawls 25 engage with teeth upon the front faces of racks 26, curved upward and forward, as shown in Fig. 1.

A short axle 27 is journaled between the intermediate beams 11 at the forward portion of the rear section A of the main frame, and this shaft is provided with pulleys 28 at one end. One pulley may be loose and the other fast, if desired, and a crank-arm 29 is located at the opposite end of the shaft. Thus, it will be observed, means are provided for driving other mechanism from the shaft. The shaft 27 is rotated by the furrow-wheel 30 contacting with the ground, and said wheel is secured on the shaft 27 at or near its center. The periphery of this wheel 30 inclines from the center in direction of its sides, and at the central portion of the periphery of the said furrow-wheel an annular rib 31 is formed upon the wheel. The rib is adapted to produce a channel in the ground for the reception of seed when a seedbox is carried by the frame. A second shaft 32 is also journaled in the longitudinal beams 11 near the rear of the main frame. A covering-wheel 33 is secured upon the shaft 32 in longitudinal alinement with the furrow-wheel 30. The peripheral face of the covering-wheel also inclines from its center in direction of its sides, and at the central portion of the periphery of the covering-wheel an annular groove 34 is made which tracks the rib 31 upon the furrow-wheel. The groove 34 serves to pack the earth to the seed which has been dropped in the furrow formed by the rib 31. In consequence of the concavity left at the top of the row by the action of the wheels 30 and 33 the uniform moisture consequent secures prompt and simultaneous germination of the seed, and the shape of the row, as well as the more prompt and even growth, facilitates the first working.

It is evident that by raising and lowering the arms 22 the front or shaft-bearing section of the device will be raised, and being locked at a proper height a suitable depth of shovels or plows, if such are used, is secured, and likewise the furrow-wheel will enter the ground to a greater or less extent. The arms 22 may also be employed to lift the entire front of the machine clear of the ground, whereupon the operator is to but slightly elevate the rear end of the frame through the medium of the handles 35 or equivalents thereof, and the frame will then be fulcrumed upon the furrow-wheel or side wheels, and the frame may be easily turned to travel in another direction.

Having thus described my invention, I claim as new and desire to secure by Letters Patent—

1. In planters and like machines, a furrow-opening wheel having its periphery inclined from the center in direction of its sides and provided with a central peripheral rib, and a covering-wheel arranged in tandem with the furrow-opening wheel, the covering-wheel having its periphery also inclined from the center in direction of its sides, the said covering-wheel having a central peripheral groove, as and for the purpose set forth.

2. In planters and like machines, the combination, with the main frame, supporting-wheels for the forward portion of said main frame, and a mechanism for raising and lowering the supporting-wheels, of a furrow-opening wheel mounted to turn in the main frame near its center, the periphery of which wheel is inclined from the center in direction of its sides and is provided with a central peripheral rib, and a covering-wheel arranged in tandem with the furrow-opening wheel, the peripheral portion of which covering-wheel is inclined from its center in direction of its sides and is provided with a central peripheral groove in track relation to the rib upon the furrow-opening wheel, as specified.

3. A planter or the like, comprising a frame, rearwardly-extending arms pivotally mounted upon the frame, means for locking the arms in position, supporting-wheels mounted in the forward ends of the said arms, a furrow-opening wheel mounted in the frame in rear of the supporting-wheels, said wheel having its periphery inclined from the center in direction of the sides and provided with a central peripheral rib, and a covering-wheel mounted in the frame in rear of the furrow-opening wheel, said covering-wheel having its periphery inclined from the center in direction of its sides and provided with a central peripheral groove, as set forth.

In testimony whereof I have signed my name to this specification in the presence of two subscribing witnesses.

JESSE RUBLE JONES.

Witnesses:
D. H. HOLDER,
REUBEN T. CLARK.